United States Patent
Zhang et al.

(10) Patent No.: US 11,769,044 B2
(45) Date of Patent: Sep. 26, 2023

(54) NEURAL NETWORK MAPPING METHOD AND APPARATUS

(71) Applicant: LYNXI TECHNOLOGIES CO., LTD., Beijing (CN)

(72) Inventors: Weihao Zhang, Beijing (CN); Han Li, Beijing (CN); Chuan Hu, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/642,266

(22) PCT Filed: Oct. 27, 2020

(86) PCT No.: PCT/CN2020/123878
§ 371 (c)(1),
(2) Date: Mar. 11, 2022

(87) PCT Pub. No.: WO2021/083105
PCT Pub. Date: May 6, 2021

(65) Prior Publication Data
US 2022/0318608 A1    Oct. 6, 2022

(30) Foreign Application Priority Data

Oct. 29, 2019    (CN) .......................... 201911035345.X (51) Int. Cl.
*G06N 3/063*    (2023.01)

(52) U.S. Cl.
CPC .................................... *G06N 3/063* (2013.01)

(58) Field of Classification Search
CPC ......... G06N 3/04; G06N 3/063; G06N 3/0454
See application file for complete search history.

(56) References Cited

U.S. PATENT DOCUMENTS

| 2016/0099010 A1* | 4/2016 | Sainath | G10L 25/30 |
| | | | 704/232 |
| 2016/0379108 A1* | 12/2016 | Chung | G06N 3/0454 |
| | | | 706/27 |

(Continued)

FOREIGN PATENT DOCUMENTS

| CN | 108229566 A | 6/2018 |
| CN | 108304922 A | 7/2018 |
| CN | 109993809 A | 7/2019 |

OTHER PUBLICATIONS

Zhang, Chen, et al. "Optimizing FPGA-based accelerator design for deep convolutional neural networks." Proceedings of the 2015 ACM/SIGDA international symposium on field-programmable gate arrays. 2015: 161-170 (Year: 2015).*

(Continued)

*Primary Examiner* — Kamran Afshar
*Assistant Examiner* — Randall K. Baldwin
(74) *Attorney, Agent, or Firm* — Li & Cai Intellectual Property (USA) Office (57) ABSTRACT

A neural network mapping method and a neural network mapping apparatus are provided. The method includes: mapping a calculation task for a preset feature map of each network layer in a plurality of network layers in a convolutional neural network to at least one processing element of a chip; acquiring the number of phases needed by a plurality of processing elements in the chip for completing the calculation tasks, and performing a first stage of balancing on the number of phases of the plurality of processing elements; and based on the number of the phases of the plurality of processing elements obtained after the first stage of balancing, mapping the calculation task for the preset feature map of each network layer in the plurality of network layers in the convolutional neural network to at least one (Continued)

processing element of the chip subjected to the first stage of balancing.

11 Claims, 8 Drawing Sheets

(56) References Cited

U.S. PATENT DOCUMENTS

| | | | | |
|---|---|---|---|---|
| 2016/0379115 | A1* | 12/2016 | Burger | G06F 15/7803 706/25 |
| 2018/0285725 | A1* | 10/2018 | Baum | G06F 30/27 |
| 2019/0220703 | A1* | 7/2019 | Prakash | G06F 9/505 |
| 2019/0340508 | A1* | 11/2019 | Liu | G06N 20/10 |
| 2019/0362227 | A1* | 11/2019 | Seshadri | G06N 3/063 |

OTHER PUBLICATIONS

Teerapittayanon, Surat, Bradley McDanel, and Hsiang-Tsung Kung. "Distributed deep neural networks over the cloud, the edge and end devices." 2017 IEEE 37th international conference on distributed computing systems (ICDCS). IEEE, 2017: 328-339 (Year: 2017).*

Yan, Bonan, et al. "RRAM-based spiking nonvolatile computing-in-memory processing engine with precision-configurable in situ nonlinear activation." 2019 Symposium on VLSI Technology. IEEE, Jun. 2019. (Year: 2019).*

Zhu, Maohua, et al. "Sparse tensor core: Algorithm and hardware co-design for vector-wise sparse neural networks on modern gpus." Proceedings of the 52nd Annual IEEE/ACM International Symposium on Microarchitecture. Oct. 12, 2019: 359-371 (Year: 2019).*

Zhan, Jun, and Jinghui Zhang. "Pipe-torch: Pipeline-based distributed deep learning in a gpu cluster with heterogeneous networking." 2019 Seventh International Conference on Advanced Cloud and Big Data (CBD). IEEE, Sep. 2019: 55-60 (Year: 2019).*

Wang, Siqi, et al. "High-Throughput CNN Inference on Embedded ARM big. LITTLE Multi-Core Processors." arXiv preprint arXiv: 1903.05898v2 (Jul. 2019): 1-14 (Year: 2019).*

Wu, Ephrem, et al. "Compute-efficient neural-network acceleration." Proceedings of the 2019 ACM/SIGDA International Symposium on Field-Programmable Gate Arrays. Feb. 2019: 191-200 (Year: 2019).*

Venieris, Stylianos I., and Christos-Savvas Bouganis. "Latency-driven design for FPGA-based convolutional neural networks." 2017 27th International Conference on Field Programmable Logic and Applications (FPL). IEEE, 2017. (Year: 2017).*

Hong, Byungchul, Yeonju Ro, and John Kim. "Multi-dimensional parallel training of winograd layer on memory-centric architecture." 2018 51st Annual IEEE/ACM International Symposium on Microarchitecture (MICRO). IEEE, 2018: 682-695 (Year: 2018).*

WIPO, International Search Report dated Jan. 10, 2021.

Jiale Yan et al. "Research on low-power neural network computing accelerator," Scientia Sinica Informationis, Science China Press, Issue 3, vol. 49, pp. 314-333, 2019.

* cited by examiner

NEURAL NETWORK MAPPING METHOD AND APPARATUS

CROSS-REFERENCE TO RELATED APPLICATION

The present disclosure is a National Phase Application filed under 35 U.S.C. 371 as a national stage of PCT/CN2020/123878, filed on Oct. 27, 2020, an application claiming priority to Chinese Patent Application No. 201911035345.X filed with the CNIPA on Oct. 29, 2019, the entire contents of which are incorporated herein by reference.

TECHNICAL FIELD

The present disclosure relates to the field of neural network technology, and particularly, to a neural network mapping method and a neural network mapping apparatus.

BACKGROUND

With artificial intelligence technology continuously applied to various fields, the research and development of chips are carried out vigorously. Most artificial intelligence mainly aims to run the chips with a faster speed or lower power consumption. However, a neural network algorithm has characteristics of high calculation amount, high parallelism and unbalanced resource distribution, and thus how to map the neural network algorithm to chips becomes an important problem.

SUMMARY

The present disclosure provides a neural network mapping method and a neural network mapping apparatus, which overcome, or at least partially solve, the above problem.

The present disclosure provides a neural network mapping method applied to a chip including a plurality of processing elements, including: mapping a calculation task for a preset feature map of each network layer in a plurality of network layers in a convolutional neural network to at least one processing element of the chip; acquiring the number of phases needed by the plurality of processing elements in the chip for completing the calculation tasks, and performing a first stage of balancing on the number of phases of the plurality of processing elements; and mapping, based on the number of the phases of the plurality of processing elements obtained after the first stage of balancing, the calculation task for the preset feature map of each network layer in the plurality of network layers in the convolutional neural network to at least one processing element of the chip.

The present disclosure further provides a neural network mapping apparatus applied to a chip, including: a mapping module configured to map a calculation task for a preset feature map of each network layer in a plurality of network layers in a convolutional neural network to at least one processing element of the chip; and a balancing module configured to acquire the number of phases needed by the plurality of processing elements in the chip for completing the calculation tasks, and perform a first stage of balancing on the number of phases of the plurality of processing elements. The mapping module is further configured to map, based on the number of the phases of the plurality of processing elements obtained after the first stage of balancing, the calculation task for the preset feature map of each network layer in the plurality of network layers in the convolutional neural network to at least one processing element of the chip.

The present disclosure further provides a computer-readable storage medium having a computer program stored therein. The program is executed by a processor to perform the above neural network mapping method.

The present disclosure further provides a computer program product. When the computer program product is run on a computer, the computer performs the above neural network mapping method.

BRIEF DESCRIPTION OF DRAWINGS

The drawings are only intended to illustrate the optional embodiments and are not considered as a limitation to the present disclosure. The same reference numerals are used to represent the same components throughout the drawings. In the drawings.

DETAIL DESCRIPTION OF EMBODIMENTS

The exemplary embodiments of the present disclosure will be described below with reference to the drawings. Although the exemplary embodiments of the present disclosure are shown in the drawings, the present disclosure may be implemented in various forms and should not be limited by the embodiments described herein. These embodiments are provided to enable the present disclosure to be understood, and enable the scope of the present disclosure to be fully conveyed to those of ordinary skill in the art.

An algorithm for allocating tasks to a processor to run the tasks is generally called a scheduling algorithm. Scheduling includes static scheduling and dynamic scheduling. The static scheduling refers to that a scheduling strategy is made before a parallel algorithm is run, and then operation is completely carried out according to the made strategy when running. Unlike the static scheduling, when the parallel algorithm is run, the dynamic scheduling can determine how to schedule for a next step according to states of the dynamic scheduling and environment. The present disclosure focuses on a "mapping" process of a neural network, the mapping here refers to a static scheduling algorithm in a narrow sense, emphasizes that a portion of the algorithm is mapped to a Processing Element (PE) of a chip, and each PE only runs the portion of the algorithm that is mapped to the PE.

Figure 1:
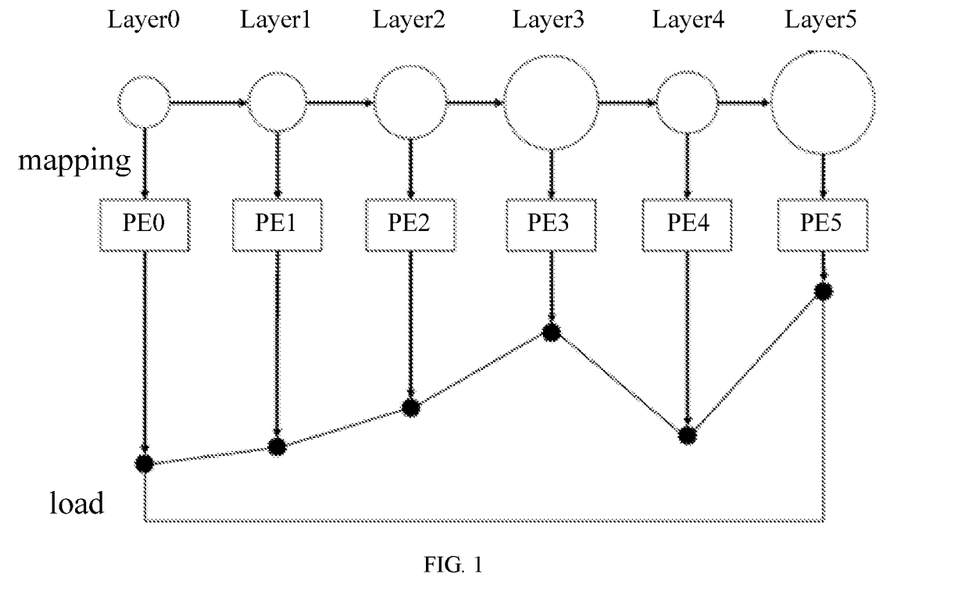
FIG. 1 is a schematic diagram illustrating neural network mapping of a conventional solution.

In general, in order to take advantage of high parallelism of a neural network, a chip has a plurality of PEs which may operate in parallel. A naive mapping algorithm is to map a plurality of network layers of the neural network to the plurality of PEs in sequence until all the layers are allocated. FIG. 1 is a schematic diagram illustrating neural network mapping of a conventional solution. As shown in FIG. 1, the neural network has six network layers in all: Layer0, Layer1, Layer2, Layer3, Layer4 and Layer5, and the six network layers are mapped to PE0, PE1, PE2, PE3, PE4 and PE5, respectively. As can be seen, the PEs have unbalanced loads through the naive mapping, resulting in a great waste of PE computing resources.

Figure 2:
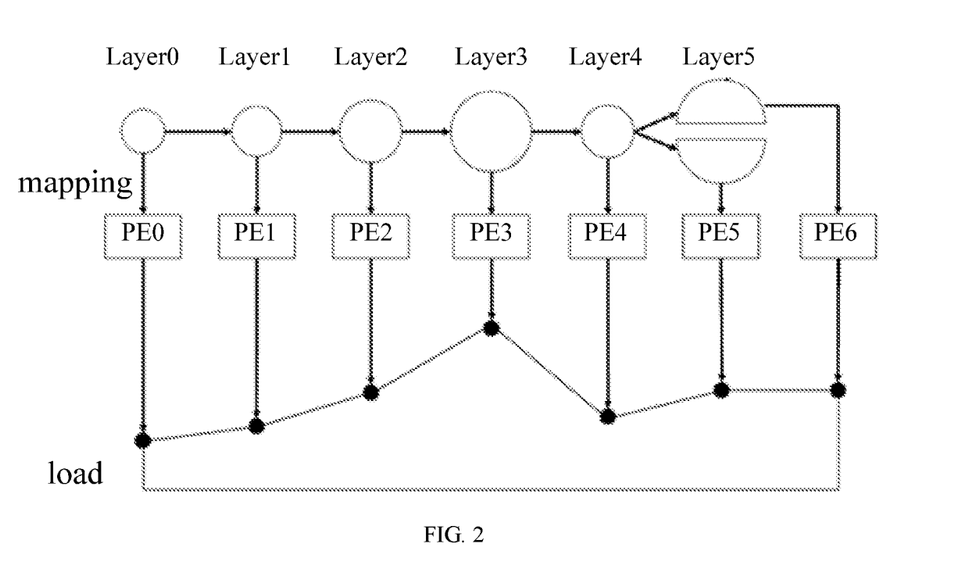
FIG. 2 is a schematic diagram illustrating neural network mapping according to the present disclosure.
Figure 3:
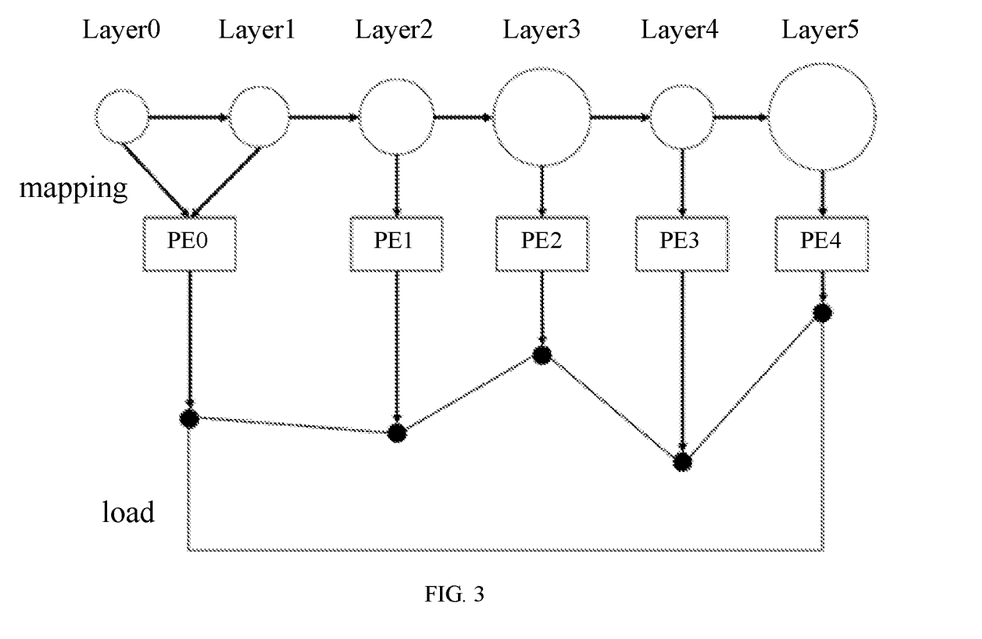
FIG. 3 is another schematic diagram illustrating neural network mapping according to the present disclosure.

In the field of parallel computing, other load balancing methods are further involved. For example, a network layer with relatively large calculation amount may be split, and one network layer is calculated by a plurality of PEs, so that a load of a high-load PE is reduced, and thus a load balancing level is improved. As shown in FIG. 2, Layer5 with relatively large calculation amount is split and then mapped to PE5 and PE 6, respectively. In addition to the above balancing method, network layers with smaller loads may be fused, that is, one PE may perform calculation for a plurality of network layers, so that calculation utilization rate of the PE is improved, and thus the load balancing level is improved. As shown in FIG. 3, Layer0 and Layer1 are fused and mapped to PE0 together.

In practical applications, when some chips run a neural network algorithm, some strong synchronization mechanisms are used to ensure correct neural network calculation time sequence, no conflict in memory reading, simple control and the like. For example, a convolutional neural network is mapped to a chip, all PEs have a strong synchronization unit phase, and one phase calculation in one layer of convolution corresponds to one sliding window before load balancing. One layer of convolution includes a plurality of sliding window calculations, one phase completes one sliding window calculation, and thus one layer of convolution needs a plurality of phases to complete the plurality of sliding window calculations. All the PEs are subjected to strong synchronization once when one phase is completed. In each phase, the PE completes convolution operations of the sliding window for which the PE is responsible. Due to imbalance of the neural network, the number of phases in different network layers may vary greatly.

Figure 4:
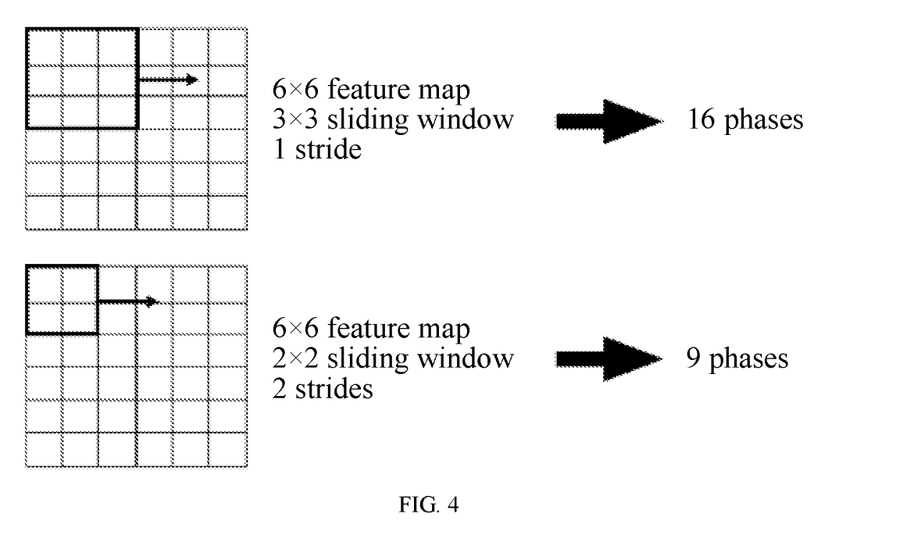
FIG. 4 is a schematic diagram illustrating a difference in the number of phases of different network layers according to the present disclosure.

As shown in FIG. 4, assuming that a network has only two network layers, the two network layers are mapped to two PEs respectively, namely PE0 and PE1, and the calculations of the corresponding network layers are completed by PE0 and PE1. The network needs 16 phases to calculate an input feature map, PE0 operates for 16 phases, and PE1 operates for 9 phases. In this way, PE1 is idle for 7 phases, resulting in a waste of computing resources.

Figure 5:
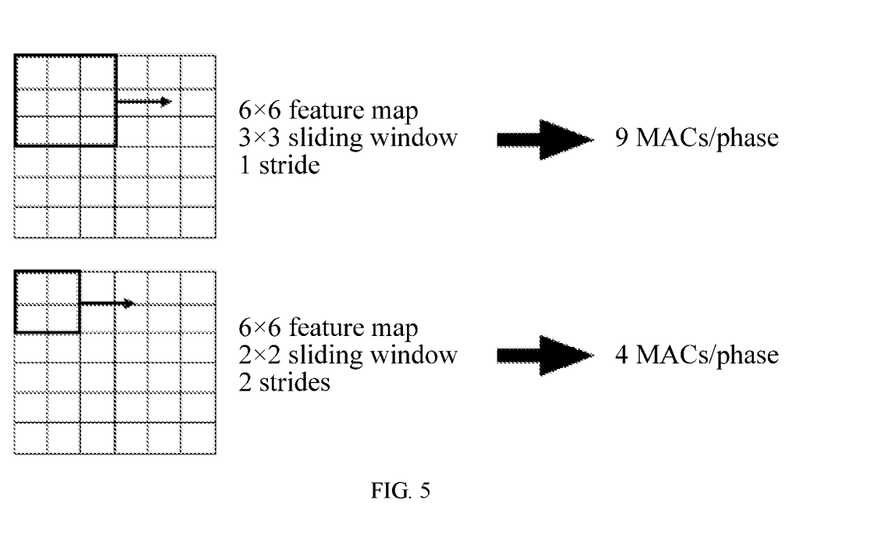
FIG. 5 is a schematic diagram illustrating a difference in the number of MACs (Multiply Accumulate operations) of different network layers according to the present disclosure.

In addition, in each phase, different network layers may be different in calculation amount. As shown in FIG. 5, the calculation amount of each network layer may be measured by the number of MACs needed by the operations. Both the phase and the MAC in the present disclosure may be taken as a load unit, that is, a unit for describing workload, which is represented as working duration for a chip. Thus, in a chip, the number of MACs may be directly proportional to the number of consumed clock cycles of the chip. In FIG. 5, a sliding window of a first network layer has a size of 3×3, so MAC=3×3=9.

In a busy phase, different PEs need different MAC lengths, which are called phase lengths. Since all the PEs are subjected to the strong synchronization according to the phase, an overall phase length may only be calculated by a maximum phase length of phase lengths needed by a plurality of PEs. For example, when a phase length is equal to 9 MACs, PE1 does not operate all the time even in a busy phase of PE1, and the calculation utilization rate of PE1 in the busy phase thereof is only 4/9×100%≈44.4%.

The strong synchronization divides calculation of loads into two stages. The load balancing methods of splitting and fusing introduced above cannot be directly applied to this situation. Thus, two stages of load balancing, that is, two stages of balancing, may be performed. A first stage of balancing is balancing of the number of phases, and a corresponding utilization rate is a phase utilization rate, which is denoted by Use$^{(1)}$. Assuming that the total number of phases needed by PE$_i$ for completing a feature map is P$_i$, a whole network needs n PEs, and a global maximum number of phases of a chip is:

$$\text{Max}P = \max_{0 \le j < n} P_j$$

Then a first-stage utilization rate of PE$_i$ is:

$$Use_i^{(1)} = \frac{P_i}{\text{Max}P}$$

A second stage of balancing is balancing of MACs (or clock cycles) in a phase, and a corresponding utilization rate is an MAC utilization rate in the phase, which is denoted by Use$^{(2)}$. Assuming that the number of MACs needed by PE$_i$ in a busy phase is PMac$_i$, a global maximum of phase lengths of the chip (a phase length is the number of clock cycles in the phase) is:

$$\text{Max}M = \max_{0 \le j < n} PMac_j$$

Then a second-stage utilization of PE$_i$ is:

$$Use_i^{(2)} = \frac{PMac_i}{\text{Max}M}$$

Then a total calculation utilization rate of PE$_i$ is:

Use$_i$=Use$_i^{(1)}$×Use$_i^{(2)}$

That is, a global utilization rate (also referred to as an average utilization rate) of n PEs is:

$$GlobalUse = \text{mean}(Use_i) = \frac{\sum_{j=0}^{n-1} Use_j^{(1)} \times Use_j^{(2)}}{n}$$

i and j have the same meaning and are used for representing an $i^{th}$ PE and a $j^{th}$ PE, respectively, and both i and j are natural numbers greater than 1.

GlobalUse is an ultimate target to be optimized. However, it is found that even if the average utilization rate of each stage is very high after the first-stage utilization rate and the second-stage utilization rate are mixed together by means of multiply accumulate, the total utilization rate is not necessarily high. Thus, it is difficult to complete the optimization in one step with GlobalUse as a target. Moreover, the two stages may affect each other, that is, optimizing the utilization rate of one stage may affect the utilization rate of the other stage, and thus, it is difficult to solve the problem of load balancing of mapping of the neural network under the strong synchronization. Therefore, the present disclosure provides a neural network mapping method to solve the problem of load balancing of mapping of the neural network under the strong synchronization, thereby completing the optimization of GlobalUse.

The neural network mapping method according to the present disclosure is applied to a chip including a plurality of PEs, such as an artificial intelligence chip, under a condition that the chip realizes strong synchronization. As can be seen from FIG. 6, the neural network mapping method includes operations S601 to S603.

Figure 6:
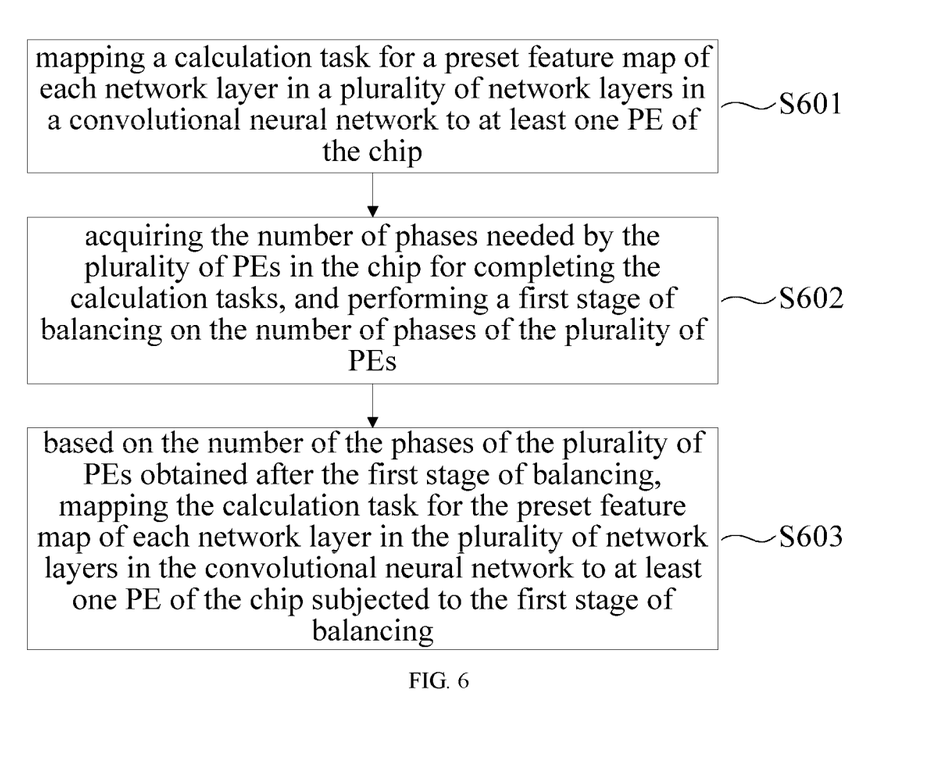
FIG. 6 is a flowchart illustrating a neural network mapping method according to the present disclosure.

At operation S601, mapping a calculation task for a preset feature map of each network layer in a plurality of network layers in a convolutional neural network to at least one PE of the chip.

At operation S602, acquiring the number of phases needed by the plurality of PEs in the chip for completing the calculation tasks, and performing a first stage of balancing on the number of phases of the plurality of PEs.

At operation S603, based on the number of the phases of the plurality of PEs obtained after the first stage of balancing, mapping the calculation task for the preset feature map of each network layer in the plurality of network layers in the convolutional neural network to at least one PE of the chip subjected to the first stage of balancing.

As described above, one layer of convolution includes a plurality of sliding window calculations, one phase completes one sliding window calculation, and thus one layer of convolution needs a plurality of phases to complete a plurality of sliding window calculations. All the PEs are subjected to strong synchronization once when one phase is completed. In each phase, the PE completes all the convolution operations of the sliding window for which the PE is responsible. Therefore, after the neural network layers are mapped to the PEs of the chip, the number of phases of each PE may be acquired for further balancing.

In the present disclosure, firstly, the calculation task for the preset feature map of the neural network may be mapped to at least one PE of the chip, and then the operation S602 is performed to, based on phase data of the plurality of PEs for completing the allocated calculation tasks, perform the first stage of balancing on the number of the phases of the plurality of PEs. Optionally, performing the first stage of balancing may include: determining whether a descent direction of the first stage of balancing exists; and if the descent direction of the first stage of balancing exists, calculating a first-stage balancing reference, and performing the first stage of balancing according to the first-stage balancing reference.

In a case where it is determined that performing the first stage of balancing causes a value of 1 minus a global utilization rate of the plurality of PEs of the chip to decrease, it is determined that the descent direction of the first stage of balancing exists.

In the present disclosure, the number of phases of any PE of the chip may be acquired, and then the total number of phases is subjected to the first stage of balancing. Performing the first stage of balancing on the total number of phases may include: determining whether the descent direction of the first stage of balancing exists. Determining whether the descent direction of the first stage of balancing exists means determining whether applying a balancing technique keeps 1-GlobalUse from increasing, that is, not worsening a balancing effect. The descent direction is a limit of a balancing technique which may be applied in the stage, and the balancing may be performed under the limit of the direction to ensure that GlobalUse in an algorithm iteration process does not descend as much as possible. The descent direction refers to that few computing resources are wasted under a current vector, that is, how to change the vector to cause 1-GlobalUse to descend. Therefore, when determining whether the descent direction of the first stage of balancing exists, a preset balancing vector may be acquired, and then whether the descent direction of the first stage of balancing exists is determined based on the preset balancing vector.

In an optional example of the present disclosure, a formula of the preset balancing vector p may be as follows:

$$p=(pr,px,pf,py,pw)$$

where pr is configured to adjust the number of MACs of a PE in one phase in a reduction loop; px is configured to adjust the number of phases of a PE in a horizontal direction; pf is configured to adjust the number of MACs of a PE in one phase in an output feature loop; py is configured to adjust the number of phases of a PE in a vertical direction; and pw is configured to adjust the number of phases and the number of MACs in the phases.

Taking the above preset balancing vector as an example, if pr plus 1 can cause 1-GlobalUse to descend, (1, 0, 0, 0, 0) is a descent direction. In the present disclosure, 1 may be added to each of the five loops of pr, px, pf, py, and pw to select an optimal effect which keeps the global utilization rate GlobalUse from decreasing.

If it is determined that the descent direction of the first stage of balancing exists, the first-stage balancing reference may be calculated. Optionally, loads of the plurality of PEs may be acquired, a reference load of balancing is set based on the loads of the plurality of PEs, and the reference load is taken as the first-stage balancing reference.

Figure 7:
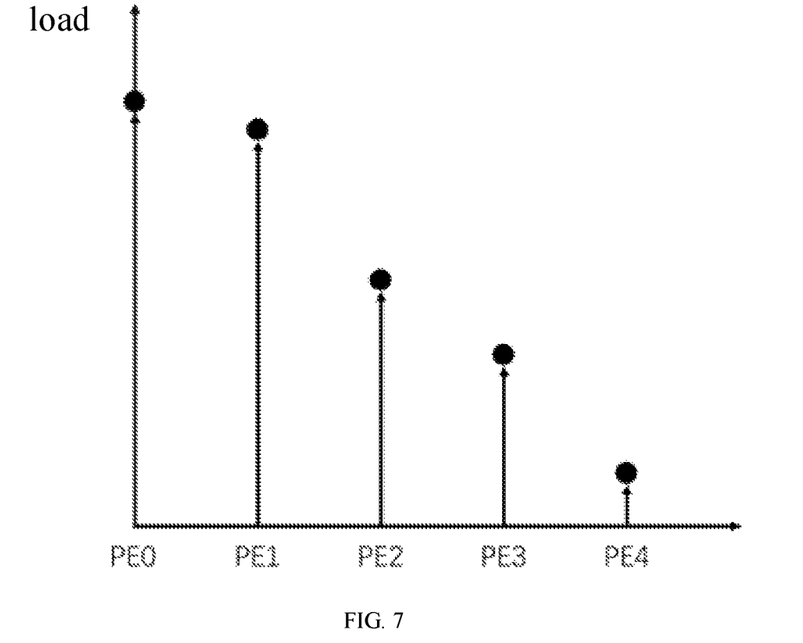
FIG. 7 is a schematic diagram illustrating PEs (Processing Elements) sequenced by load according to the present disclosure.
Figure 8:
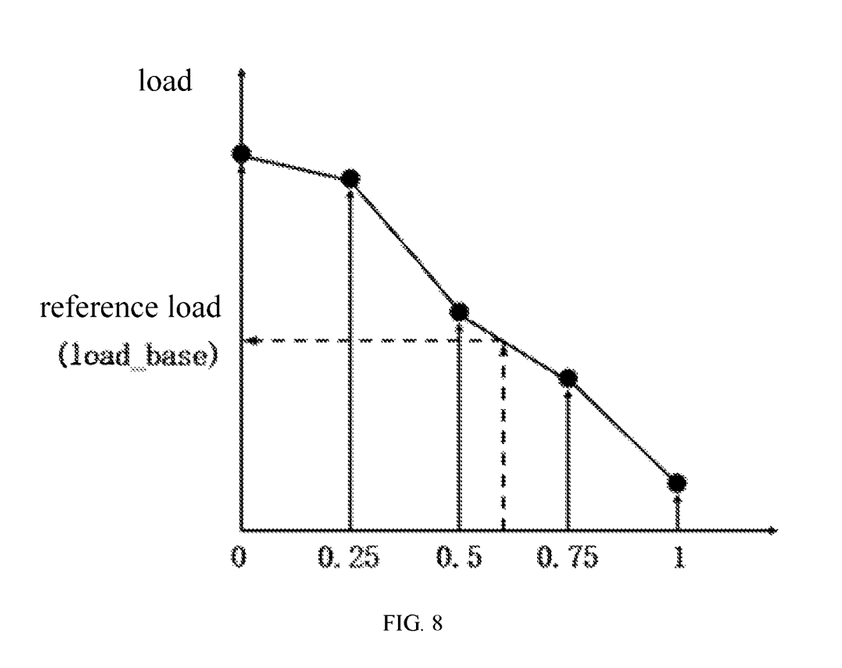
FIG. 8 is a schematic diagram illustrating linear interpolation and selection of a balancing reference according to the present disclosure.

Optionally, as an implementation, when the reference load is set, a reference PE may be selected from the plurality of PEs, that is, a load of the task for which one PE is responsible is taken as the reference load, and the loads of the tasks for which the other PEs are responsible are kept level with the load of the PE as much as possible. In another implementation, a balancing ratio may be set, that is, all the PEs are sequenced by load, and as shown in FIG. 7, PE0 to PE4 are sequenced by load from high to low. The loads of all the PEs in FIG. 7 are linearly interpolated and the abscissa is scaled to 0 to 1, and then a point is selected as the balancing reference, as shown in FIG. 8.

After the balancing reference is determined, the balancing may be performed in a preset balancing mode. For example, a balancing reference load load_base may be set during the balancing, and a parallelism may be calculated if other loads exceed the reference load load_base, for example, the balancing reference is 2 and the load is 3, then a desirable parallelism is 2, and parallelism parameters may be allocated according to the parallelism in subsequent operations. In the present disclosure, a first balancing vector $p_1$ may be extracted from the preset balancing vector p, and the first stage of balancing is performed by using the first balancing vector according to the first-stage balancing reference; and the first balancing vector may be $p_1$ and $p_1$=(px, py, pw).

As described above, the preset balancing vector p=(pr, px, pf, py, pw), and provides five balancing techniques are provided as follows:

pr: parallelism of reduction loop, which is a parallelism of a PE in the reduction loop and is configured to adjust the number of MACs of a PE in one phase in the reduction loop;

px: parallelism of x loop, which is a parallelism of a PE in the x loop and is configured to adjust the number of phases of a PE in a horizontal direction;

pf: parallelism of feature loop, which is a parallelism of a PE in an output feature loop and is configured to adjust the number of MACs of a PE in one phase in the output feature loop;

py: parallelism of y loop, which is a parallelism of a PE in the y loop and is configured to adjust the number of phases of a PE in a vertical direction; and pw: phase window, which is the number of sliding windows for calculation of one phase of a PE and is configured to adjust the number of phases and the number of MACs in the phases.

The naming of the above loops is on the basis of a standard for loop of the convolution operation, and the standard for loop is described as follows:

```
for y: 0 to ny   // the number of sliding windows in the vertical direction
   for x: 0 to nx   // the number of sliding windows in the horizontal direction
      for f: 0 to nf   // the number of output features (channels)
         output[y][x][f] = 0
         for r: 0 to nr   // the number of input features (channels), that is, the
reduction loop of the input features
            for ky: 0 to nky   // a size of a kernel in the vertical direction
               for kx: 0 to nkx   // a size of a kernel in the horizontal direction
                  // stride = 1, simplifying padding
                  output[y][x][f] += weight[f][r][ky][kx] * input[y+ky][x+kx][r]
```

Figure 9:
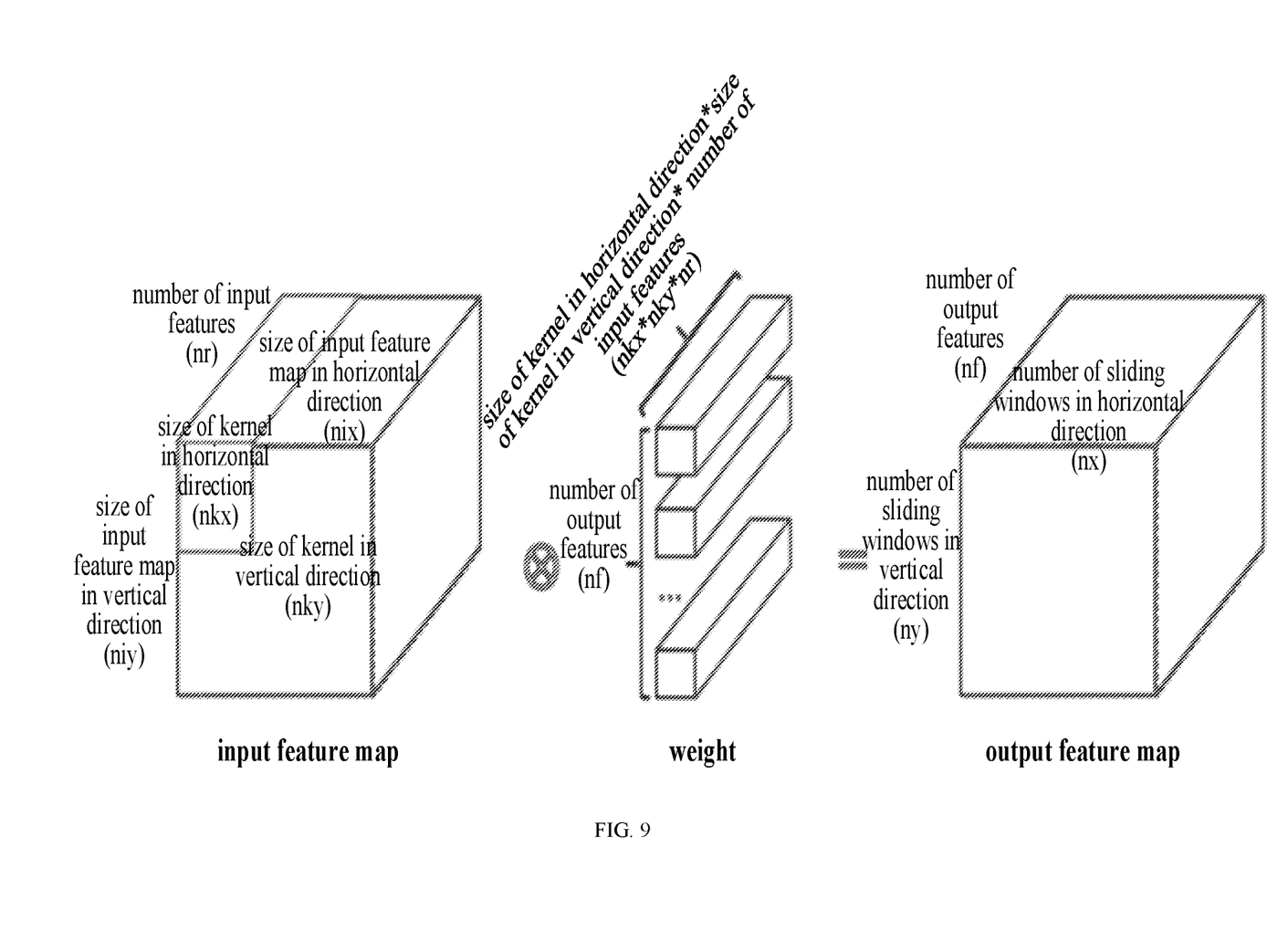
FIG. 9 is a schematic diagram illustrating convolution calculation encoding according to the present disclosure.

The convolution operation contains 6 layers of loops, which may be taken as 6 directions: x, y, f, r, ky and kx. Any one of the 6 directions with n (number) placed therebefore indicates a size of the direction, as shown in FIG. 9 (nix and niy indicate the number of input x and the number of input y, respectively). The balancing vector is obtained by combining the above five balancing techniques together, and each balancing technique varies in the effect on the balancing. FIG. 9 is a schematic diagram illustrating convolution calculation encoding according to the present disclosure.

pr: adjusting the number of MACs in one phase and having no influence on the number of phases. When the load in one phase is relatively large, pr may be increased to reduce the number of MACs in one phase. pr has no redundant storage and has a large influence on a MAC parallelism, and thus pr may be mainly used for the second stage of balancing.

px: adjusting the number of phases and having no influence on MACs in the phases. When the number of phases included in one PE is too large, px may be increased. px limits a maximum value, input and weight storage redundancy of pw, and may be mainly used for the first stage of balancing.

pf: adjusting the number of MACs in one phase and having no influence on the number of phases. When the load in one phase is relatively large, pf may be increased to reduce the number of MACs in one phase. Input redundant storage of pf may lead to complex routing, and thus pr may be mainly used for the second stage of balancing.

py: adjusting the number of phases and having no influence on MACs in the phases. When the number of phases included in one PE is too large, py may be increased. py limits the maximum value, the input and the weight storage redundancy of pw, and may be mainly used for the first stage of balancing.

pw: adjusting the number of phases and the number of MACs in phases. When pw increases, the number of phases decreases (pw is the number of sliding windows for calculation of one phase, and the total number of sliding windows of one network layer is constant, so that the needed phases is decreased when pw increases), and the number of MACs in phases increase. pw limits a maximum value of px, and may be used for the first stage of balancing or the second stage of balancing.

In the present disclosure, after the first stage of balancing is finished and the calculation tasks for the preset feature map of the plurality of network layers in the convolutional neural network are mapped to the PEs, the second stage of balancing may be performed, that is: acquiring the number of MACs in the plurality of phases, and performing the second stage of balancing based on the number of MACs in the plurality of phases; and after the second stage of balancing is completed, mapping the calculation tasks for the preset feature map of the plurality of network layers in the convolutional neural network to at least one PE of the chip subjected to the second stage of balancing. In the embodiment, a method of the second stage of balancing is similar to that of the first stage of balancing, and may include: acquiring the number of MACs in the plurality of phases, and determining whether a descent direction of the second stage of balancing exists; and if the descent direction of the second stage of balancing exists, calculating a second-stage balancing reference, and performing the second stage of balancing according to the second-stage balancing reference. Reference may be made to the method used in the first stage of balancing for the method of determining whether the descent direction of the second stage of balancing exists and calculating the second-stage balancing reference, and such method is not repeatedly described herein.

In a case where it is determined that performing the second stage of balancing causes a value of 1 minus a global utilization rate of the plurality of PEs of the chip to decrease, it is determined that the descent direction of the second stage of balancing exists.

When the second stage of balancing is performed, a second balancing vector $p_2$ may be extracted from the preset balancing vector, and the second stage of balancing is performed by using the second balancing vector according to the second-stage balancing reference; and the second balancing vector may be $p_2$, and $p_2$=(pr, pf, pw).

In addition, in a case where the first stage of balancing is performed and the second stage of balancing is not performed, if it is determined that the descent direction of the first stage of balancing does not exist, which means that a balancing requirement is met or the balancing cannot be continued at the moment, the balancing is ended; and in a case where both the first stage of balancing and the second stage of balancing are performed, if it is determined that neither the descent direction of the first stage of balancing nor the descent direction of the second stage of balancing exists, which means that the balancing requirement is met or the balancing cannot be continued at the moment, the balancing is ended.

In the present disclosure, assuming that the descent direction of the first stage of balancing or the descent direction of the second stage of balancing still exists after the first stage of balancing and the second stage of balancing are performed, at this time, an iteration of the first stage of balancing and the second stage of balancing may be performed until the balancing requirement is met or the balancing cannot be continued.

Figure 10:
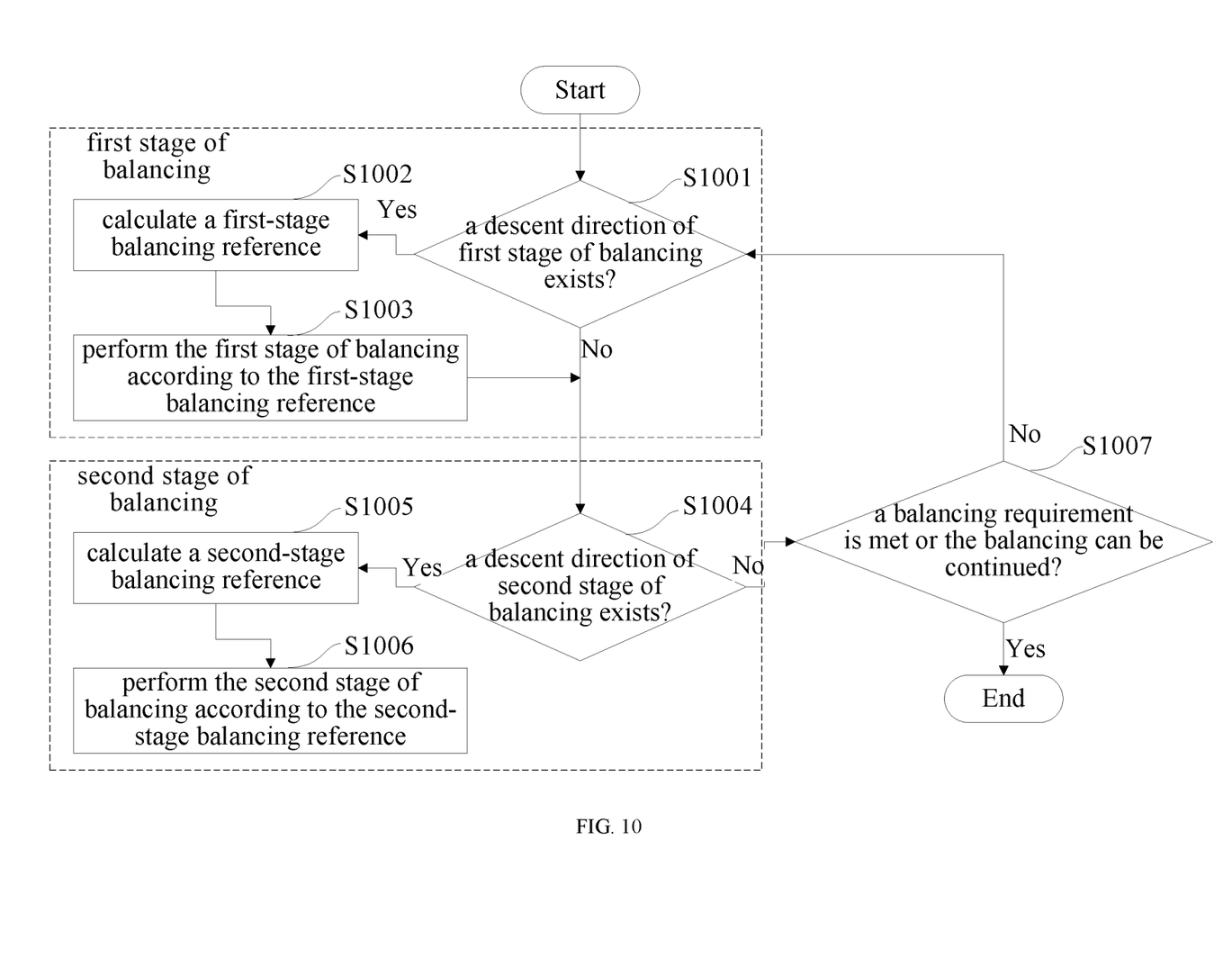
FIG. 10 is another flowchart illustrating a neural network mapping method according to the present disclosure.

FIG. 10 is another flowchart illustrating a neural network mapping method according to the present disclosure. As can be seen from FIG. 10, the method mainly includes two stages of balancing, and includes operations S1001 to S1007.

At operation S1001, after mapping calculation tasks for a preset feature map of a plurality of network layers in a convolutional neural network to a chip, determining whether a descent direction of first stage of balancing exists; and if the descent direction of the first stage of balancing exists, performing operation S1002, and if the descent direction of the first stage of balancing does not exist, performing operation S1004.

At operation S1002, calculating a first-stage balancing reference.

At operation S1003, performing the first stage of balancing according to the first-stage balancing reference, and then performing operation S1004.

At operation S1004, determining whether a descent direction of second stage of balancing exists; and if the descent direction of the second stage of balancing exists, performing operation S1005, and if the descent direction of the second stage of balancing does not exist, performing operation S1007.

At operation S1005, calculating a second-stage balancing reference.

At operation S1006, performing the second stage of balancing according to the second-stage balancing reference.

At operation S1007, determining whether a balancing requirement is met or the balancing can be continued; if the balancing requirement is met or the balancing cannot be continued, ending the balancing; if the balancing request is not met and the balancing can be continued, returning to operation S1001.

In the present disclosure, two stages of balancing are taken as an example, the process may be summarized as follows: mapping→first stage of balancing→mapping→second stage of balancing→mapping→first stage of balancing, so as to perform an iteration of the two stages of balancing to reduce the mutual influences of the two stages of balancing. In the present disclosure, a simulator of hardware may be used during mapping, evaluation of a mapping algorithm is performed in the simulator during an iterative process to finally obtain a good mapping solution, and then the obtained mapping solution is applied to a real hardware. During the evaluation process, a strategy may be mapped to the simulator.

Figure 11:
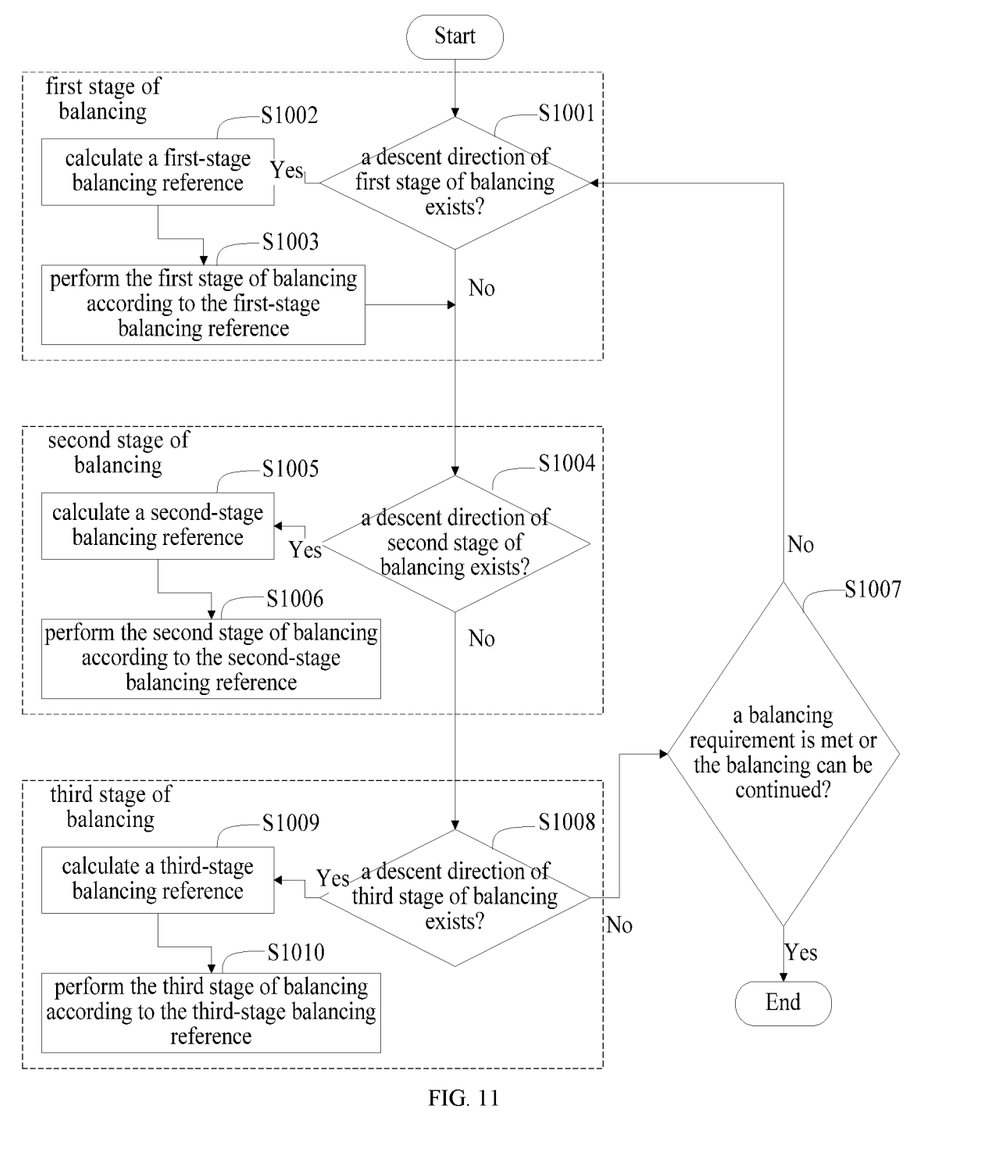
FIG. 11 is still another flowchart illustrating a neural network mapping method according to the present disclosure.

In the present disclosure, if the chip has a plurality of layers of synchronization mechanisms, the number of stages of balancing will exceed 2. FIG. 11 is still another flowchart illustrating a neural network mapping method according to the present disclosure. With reference to FIG. 11, if it is determined that the descent direction of the second stage of balancing does not exist in operation S1004, operation S1008 is performed.

At operation S1008, it is determined whether a descent direction of third stage of balancing exists; and if the descent direction of the third stage of balancing exists, operation S1009 is performed, and if the descent direction of the third stage of balancing does not exist, operation S1007 is performed.

In a case where it is determined that performing the third stage of balancing causes the value of 1 minus a global utilization rate of the plurality of PEs of the chip to decrease, it is determined that the descent direction of third stage of balancing exists.

At operation S1009, a third-stage balancing reference is calculated.

At operation S1010, the third stage of balancing is performed according to the third-stage balancing reference.

For example, to achieve the high parallelism, a chip may have pulse array elements, and one pulse array element may complete a large number of multiply accumulate calculations in one clock cycle. Assuming that one pulse array element has a parallelism of 64, that is, at most 64 times of multiply accumulate calculations can be completed within one clock cycle, if the calculation amount of one clock cycle is less than 64 times of multiply accumulate calculations, the computing resources in the clock cycle are not fully utilized. In such a case, the number of balancing stages is set to three with the clock cycle taken as a strong synchronization unit together with the phase synchronization.

Figure 12:
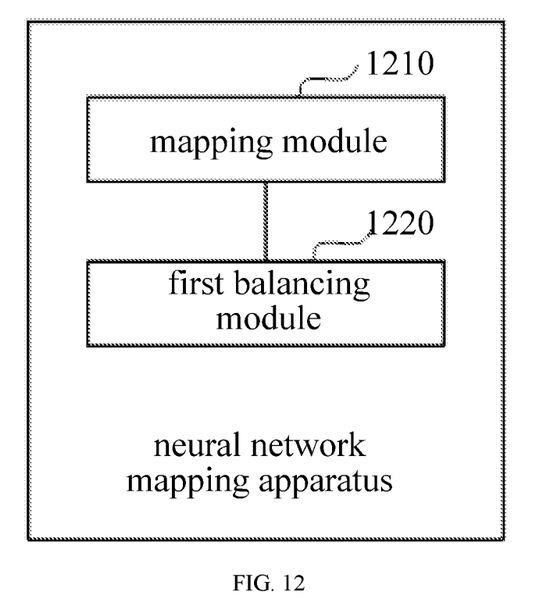
FIG. 12 is a schematic structural diagram of a neural network mapping apparatus according to the present disclosure.

The present disclosure further provides a neural network mapping apparatus, which is applied to a chip. As shown in FIG. 12, the apparatus may include: a mapping module 1210 configured to map a calculation task for a preset feature map of each network layer in a plurality of network layers in a convolutional neural network to at least one PE of the chip; and a first balancing module 1220 configured to acquire the number of phases needed by the plurality of PEs in the chip for completing the calculation tasks, and perform a first stage of balancing on the number of phases of the plurality of PEs. The mapping module 1210 is further configured to map, based on the number of the phases of the plurality of PEs obtained after the first stage of balancing, the calculation task for the preset feature map of each network layer in the plurality of network layers in the convolutional neural network to at least one PE of the chip subjected to the first stage of balancing.

In the present disclosure, the first balancing module 1220 is configured to perform the first stage of balancing on the number of phases of the plurality of PEs by the following: determining whether a descent direction of the first stage of balancing exists; in a case where it is determined that performing the first stage of balancing causes a value of 1 minus a global utilization rate of the plurality of PEs to decrease, determining that the descent direction of the first stage of balancing exists; and if the descent direction of the first stage of balancing exists, calculating a first-stage balancing reference, and performing the first stage of balancing according to the first-stage balancing reference.

In the present disclosure, the first balancing module 1220 is configured to determine whether the descent direction of the first stage of balancing exists by the following: acquiring a preset balancing vector, and determining whether the descent direction of the first stage of balancing exists based on the preset balancing vector.

In the present disclosure, the first balancing module 1220 is configured to calculate the first-stage balancing reference by the following: acquiring loads of the plurality of PEs, setting a reference load of balancing based on the loads of the plurality of PEs, and taking the reference load as the first-stage balancing reference.

In the present disclosure, the first balancing module 1220 is configured to perform the first stage of balancing according to the first-stage balancing reference by the following: extracting a first balancing vector from the preset balancing vector, and performing the first stage of balancing by using the first balancing vector according to the first-stage balancing reference. The first balancing vector is $p_1$, $p_1=(px, py, pw)$, where px is configured to adjust the number of phases of a PE in a horizontal direction, py is configured to adjust the number of phases of a PE in a vertical direction, and pw is configured to adjust the number of phases and the number of MACs in the phases.

Figure 13:
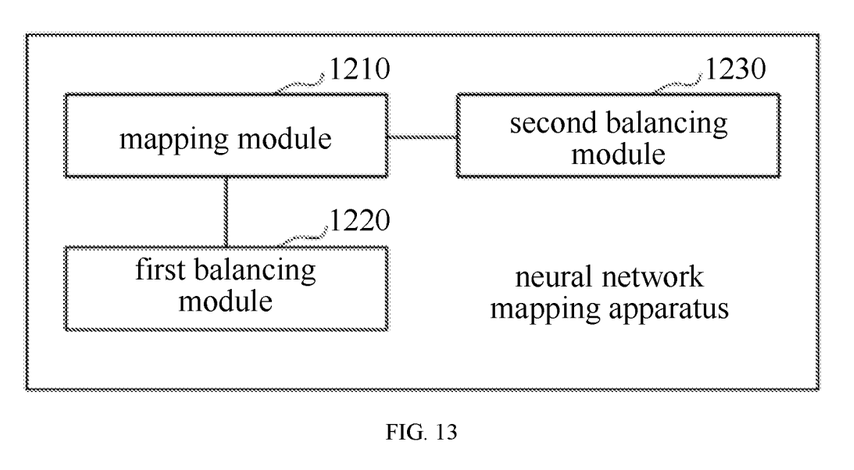
FIG. 13 is another schematic structural diagram of a neural network mapping apparatus according to the present disclosure.

In the present disclosure, as shown in FIG. 13, the apparatus may further include: a second balancing module 1230 configured to acquire the number of MACs in the plurality of phases, and perform a second stage of balancing based on the number of MACs in the plurality of phases. The mapping module 1210 may be further configured to map the calculation task for the preset feature map of each network layer in the plurality of network layers in the convolutional neural network to at least one PE of the chip subjected to the second stage of balancing.

In the present disclosure, the second balancing module 1230 is configured to acquire the number of MACs in the plurality of phases and perform the second stage of balancing based on the number of MACs in the plurality of phases by the following: acquiring the number of MACs in each phase, and determining whether a descent direction of the second stage of balancing exists; in a case where it is determined that performing the second stage of balancing causes the value of 1 minus the global utilization rate of the plurality of PEs to decrease, determining that the descent direction of the second stage of balancing exists; and if the descent direction of the second stage of balancing exists, calculating a second-stage balancing reference, and performing the second stage of balancing according to the second-stage balancing reference.

The present disclosure further discloses a computer-readable storage medium having a computer program stored therein. The program is executed by a processor to perform the neural network mapping method according to any one of the above embodiments.

The present disclosure further discloses a computer program product. When the computer program product is run on a computer, the computer performs the neural network mapping method according to any one of the above embodiments.

The embodiments of the present disclosure provide a neural network mapping method and a neural network mapping apparatus. In the solutions provided by the present disclosure, under a constraint of a synchronization unit, the first stage of balancing and the second stage of balancing may be performed before the neural network is mapped, a mapping algorithm which takes resource balancing as a target and meets resource constraint conditions is provided for each stage, and the resource balancing and the resource constraint may be comprehensively abstracted as a feasible descent direction. If there are a plurality of (m) synchronization units, the mapping algorithm may be extended to a plurality of (m+1) stages. Compared with the conventional algorithm, the neural network mapping method according to the present disclosure can better solve a problem of many-core load balancing under the synchronization constraint.

In order to simplify the present disclosure and help understand one or more aspects of the present disclosure, features of the present disclosure are sometimes grouped together in a single embodiment, drawing, or description thereof in the above description of the exemplary embodiments of the present disclosure. However, the method of the present disclosure should not be interpreted as reflecting the intention that the claimed disclosure requires more features than those explicitly recorded in each claim. More precisely, as reflected in the following claims, a disclosed aspect is less than all the features of the previously disclosed single embodiment. Therefore, the claims according to the description hereby are explicitly incorporated into the description, with each claim itself being regarded as a single embodiment of the present disclosure.

It should be understood by those of ordinary skill in the art that the modules in the devices in the embodiments may be adaptively changed and arranged in one or more devices different from those disclosed in the embodiments. The modules or units or components in the embodiments may be combined into one module or unit or component, and may also be divided into a plurality of sub-modules or sub-units or sub-components. Except that at least some of the features and/or processes or units are mutually exclusive, all the features disclosed in the specification (including the claims, abstract and drawings) and all the processes or units of any method or device such disclosed may be combined in any way. Unless expressly stated otherwise, each feature disclosed in the specification (including the claims, abstract and drawings) may be replaced with an alternative feature capable of achieving the same, equivalent or similar objective.

Moreover, it should be understood by those of ordinary skill in the art that, although some embodiments described herein include some features, but not other features, included in other embodiments, the combinations of the features of different embodiments are intended to fall within the scope of the present disclosure and form different embodiments. For example, any one of the claimed embodiments in the claims may be implemented in the form of a combination.

The above embodiments are intended to illustrate but not limit the present disclosure and those of ordinary skill in the art can design alternative embodiments without departing from the scope of the appended claims. In the claims, none of the reference numerals placed between parentheses shall be considered as limitations on the claims. The term "comprising" does not exclude the existence of elements or steps which are not listed in the claims. The term "a" or "one" before an element does not exclude the existence of a plurality of such elements. The present disclosure can be implemented by means of hardware including several different elements and by means of a properly programmed computer. In the unit claims listing a plurality of devices, several of those devices can be specifically implemented by one same hardware item. The terms "first", "second" and "third" used herein do not indicate any sequence, and may be interpreted as names.

What is claimed is:

1. A neural network mapping method applied to a chip comprising a plurality of processing elements, comprising:
mapping a calculation task for a preset feature map of each network layer in a plurality of network layers in a convolutional neural network to at least one processing element of the chip;
acquiring a number of phases needed by the plurality of processing elements in the chip for completing the calculation task, and performing a first stage of balancing on the number of phases of the plurality of processing elements; and
mapping, based on the number of the phases of the plurality of processing elements obtained after the first stage of balancing, the calculation task for the preset feature map of each network layer in the plurality of network layers in the convolutional neural network to at least one processing element of the chip,
wherein performing the first stage of balancing on the number of phases of the plurality of processing elements comprises:
determining whether a descent direction of the first stage of balancing exists; and
calculating, in response to a determination result that the descent direction of the first stage of balancing exists, a first-stage balancing reference, and performing the first stage of balancing according to the first-stage balancing reference.

2. The method of claim 1, wherein determining whether the descent direction of the first stage of balancing exists comprises:
in a case where it is determined that performing the first stage of balancing causes a value of 1 minus a global utilization rate of the plurality of processing elements to decrease, determining that the descent direction of the first stage of balancing exists.

3. The method of claim 2, wherein determining whether the descent direction of the first stage of balancing exists comprises:
acquiring a preset balancing vector, and determining whether the descent direction of the first stage of balancing exists based on the preset balancing vector.

4. The method of claim 3, wherein a formula of the preset balancing vector is:

$$p=(pr,px,pf,py,pw)$$

wherein p is the preset balancing vector;
pr is configured to adjust a number of Multiply Accumulate operations (MACs) of a processing element in one phase in a reduction loop;
px is configured to adjust the number of phases of a processing element in a horizontal direction;
pf is configured to adjust the number of MACs of a processing element in one phase in an output feature loop;
py is configured to adjust the number of phases of a processing element in a vertical direction; and
pw is configured to adjust the number of phases and the number of MACs in the phases.

5. The method of claim 1, wherein calculating the first-stage balancing reference comprises:
acquiring loads of the plurality of processing elements, setting a reference load of balancing based on the loads of the plurality of processing elements, and taking the reference load as the first-stage balancing reference.

6. The method of claim 4, wherein performing the first stage of balancing according to the first-stage balancing reference comprises:
extracting a first balancing vector from the preset balancing vector, and performing the first stage of balancing by using the first balancing vector according to the first-stage balancing reference;
wherein $p_1$=(px, py, pw), and p1 is the first balancing vector,
px is configured to adjust the number of phases of a processing element in the horizontal direction,
py is configured to adjust the number of phases of a processing element in the vertical direction, and pw is configured to adjust the number of phases and the number of MACs in the phases.

7. The method of claim 1, wherein after mapping, based on the number of the phases of the plurality of processing elements obtained after the first stage of balancing, the calculation task for the preset feature map of each network layer in the plurality of network layers in the convolutional neural network to at least one processing element of the chip, the method further comprises:
acquiring a number of MACs in the plurality of phases, and performing a second stage of balancing based on the number of MACs in the plurality of phases; and
mapping the calculation task for the preset feature map of the plurality of network layers in the convolutional neural network to at least one processing element of the chip subjected to the second stage of balancing.

8. The method of claim 7, wherein acquiring the number of MACs in the plurality of phases, and performing the second stage of balancing based on the number of MACs in the plurality of phases comprises:
acquiring the number of MACs in each phase, and determining whether a descent direction of the second stage of balancing exists; in a case where it is determined that performing the second stage of balancing causes the value of 1 minus the global utilization rate of the plurality of processing elements to decrease, determining that the descent direction of the second stage of balancing exists; and
calculating, in response to a determination result that the descent direction of the second stage of balancing exists, a second-stage balancing reference, and performing the second stage of balancing according to the second-stage balancing reference.

9. The method of claim 7, after mapping the calculation task for the preset feature map of the plurality of network layers in the convolutional neural network to at least one processing element of the chip subjected to the second stage of balancing, the method further comprises:
performing an iteration of the first stage of balancing and the second stage of balancing.

10. A neural network mapping apparatus, comprising a memory, a processor, and a computer program stored in the memory and executable on the processor, wherein the processor, when executing the computer program, implements a neural network mapping method applied to a chip comprising a plurality of processing elements, and wherein the method comprises:
mapping a calculation task for a preset feature map of each network layer in a plurality of network layers in a convolutional neural network to at least one processing element of the chip;

acquiring a number of phases needed by the plurality of processing elements in the chip for completing the calculation task, and performing a first stage of balancing on the number of phases of the plurality of processing elements; and mapping, based on the number of the phases of the plurality of processing elements obtained after the first stage of balancing, the calculation task for the preset feature map of each network layer in the plurality of network layers in the convolutional neural network to at least one processing element of the chip, wherein performing the first stage of balancing on the number of phases of the plurality of processing elements comprises:

determining whether a descent direction of the first stage of balancing exists; and calculating, in response to a determination result that the descent direction of the first stage of balancing exists, a first-stage balancing reference, and performing the first stage of balancing according to the first-stage balancing reference.

11. A non-transitory computer-readable storage medium, storing a computer program, wherein the program is executed by a processor to perform a neural network mapping method applied to a chip comprising a plurality of processing elements, comprising:

mapping a calculation task for a preset feature map of each network layer in a plurality of network layers in a convolutional neural network to at least one processing element of the chip;

acquiring a number of phases needed by the plurality of processing elements in the chip for completing the calculation task, and performing a first stage of balancing on the number of phases of the plurality of processing elements; and mapping, based on the number of the phases of the plurality of processing elements obtained after the first stage of balancing, the calculation task for the preset feature map of each network layer in the plurality of network layers in the convolutional neural network to at least one processing element of the chip, wherein performing the first stage of balancing on the number of phases of the plurality of processing elements comprises:

determining whether a descent direction of the first stage of balancing exists; and calculating, in response to a determination result that the descent direction of the first stage of balancing exists, a first-stage balancing reference, and performing the first stage of balancing according to the first-stage balancing reference.

* * * * *